US009179484B2

(12) United States Patent
Chen et al.

(10) Patent No.: US 9,179,484 B2
(45) Date of Patent: Nov. 3, 2015

(54) METHOD AND DEVICE FOR ALLOCATING GROUP IDENTIFIER

(71) Applicant: Huawei Technologies Co., Ltd., Shenzhen, Guangdong (CN)

(72) Inventors: Qingyong Chen, Shenzhen (CN); Jianjun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 14/206,888

(22) Filed: Mar. 12, 2014

(65) Prior Publication Data

US 2014/0211707 A1  Jul. 31, 2014

Related U.S. Application Data

(63) Continuation of application No. PCT/CN2012/080817, filed on Aug. 31, 2012.

(30) Foreign Application Priority Data

Sep. 14, 2011  (CN) .......................... 2011 1 0271894

(51) Int. Cl.
*H04W 72/04* (2009.01)
*H04W 76/02* (2009.01)
*H04W 4/08* (2009.01)
(Continued)

(52) U.S. Cl.
CPC .............. *H04W 76/021* (2013.01); *H04W 4/08* (2013.01); *H04W 8/26* (2013.01); *H04B 7/0452* (2013.01); *H04W 24/02* (2013.01)

(58) Field of Classification Search
None
See application file for complete search history.

(56) References Cited

U.S. PATENT DOCUMENTS 8,687,741 B1 *  4/2014  Erell .............................. 375/340
2010/0008235 A1  1/2010  Tinnakornsrisuphap et al.
(Continued)

FOREIGN PATENT DOCUMENTS

CN        1462524 A    12/2003
CN      101272305 A     9/2008
(Continued)

OTHER PUBLICATIONS

Fang et al., "A Two-level Carrier Sensing Mechanism For Overlapping BSS Problem in WLAN," The 14$^{th}$ IEEE Workshop on Local and Metropolitan Area Networks, In the Proceedings of LANMAN 2005, pp. 1-6, Institute of Electrical and Electronics Engineers, New York, New York (Sep. 18, 2005).

(Continued)

*Primary Examiner* — Brandon Renner
(74) *Attorney, Agent, or Firm* — Leydig, Voit & Mayer, Ltd.

(57) ABSTRACT

Embodiments of the present invention discloses a method and a device for allocating a group identifier, which can allocate a non-conflict GID to a non-AP STA in an area covered by multiple BSS networks, so that the problem of GID conflict which is occurred when allocating the GID for the non-AP STA can be reduced. A method provided by the embodiment of the present invention includes: dividing all group identifiers (GIDs) into N parts according to number of the GIDs, and respectively allocating the N parts to N basic service set (BSS) networks, which communicate in a multi user-multiple input multiple output (MU-MIMO) mode, where the N BSS networks have a common area, N is a natural number which is bigger than 1.

15 Claims, 3 Drawing Sheets

(51) Int. Cl.
*H04W 8/26* (2009.01)
*H04B 7/04* (2006.01)
*H04W 24/02* (2009.01)

(56) References Cited

U.S. PATENT DOCUMENTS

| | | | |
|---|---|---|---|
| 2010/0008258 A1 | 1/2010 | Ji et al. | |
| 2011/0063989 A1* | 3/2011 | Yang et al. | 370/252 |
| 2011/0188598 A1 | 8/2011 | Lee et al. | |
| 2012/0051312 A1* | 3/2012 | Noh et al. | 370/329 |
| 2012/0142391 A1 | 6/2012 | Kwon et al. | |
| 2013/0010664 A1* | 1/2013 | Kang et al. | 370/311 |

FOREIGN PATENT DOCUMENTS

| | | |
|---|---|---|
| CN | 102090090 A | 6/2011 |
| CN | 102090098 A | 6/2011 |
| CN | 102571174 A | 7/2012 |
| WO | WO 02093831 A2 | 11/2002 |

OTHER PUBLICATIONS

Zhu et al., "Multi-User Support in Next Generation Wireless LAN," The 8th Annual IEEE Consumer Communications and Networking Conference, pp. 1120-1121, Institute of Electrical and Electronics Engineers, New York, New York (Jan. 9-12, 2011).

"Draft Standard for Information Technology-Telecommunications and information exchange between systems—Local and metropolitan area networks—Specific requirements, Part 11: Wireless LAN Medium Access Control (MAC) and Physical Layer (PHY) Specifications, Amendment 5: Enhancements for Very High Throughput for Operation in Bands below 6 GHz," IEEE P802.11ac/D1.0, pp. i-242, Institute of Electrical and Electronics Engineers, New York, New York (May 2011).

Ong et al., "IEEE 802.11ac: Enhancements for Very High Throughput WLANs," IEEE 22nd International Symposium on Personal, Indoor and Mobile Radio Communications, pp. 849-853, Institute of Electrical and Electronics Engineers, New York, New York (Sep. 11, 2011).

\* cited by examiner

METHOD AND DEVICE FOR ALLOCATING GROUP IDENTIFIER

CROSS REFERENCE TO RELATED APPLICATIONS

This application is a continuation of International Patent Application No. PCT/CN2012/080817, filed on Aug. 31, 2012, which claims priority to Chinese Patent Application No. 201110271894.4, filed on Sep. 14, 2011, both of which are hereby incorporated by reference in their entireties.

FIELD OF THE TECHNOLOGY

The present invention relates to the field of communication technology and, in particular, to a method and a device for allocating a group identifier.

BACKGROUND

As stipulated in institute of electrical and electronics engineers (IEEE) 802.11ac: a basic service set (BSS) is composed of stations (STA) with certain relations within a specific overlay area. In a BSS network, only one central station which full-time manages the BSS, is called an Access Point (AP), and other stations in the BSS network except the AP are called terminals, also known as non-AP STAs.

In a BSS network, the group ID (GID) of the non-AP STA is allocated by the AP in the BSS network, when the AP performs the multi user-multiple input multiple output (MU-MIMO) transmission, the multiple non-AP STAs perform the MU-MIMO transmission in the same Group have the same group ID. Each non-AP STA judges, at the physical layer, that whether the non-AP STA itself belongs to the group according to its GID, if yes, then performs the decoding, if not, then does not perform the decoding, so as to save power of the non-AP STA.

In prior arts, for one BSS network, the group IDs of the non-AP STAs are allocated by the AP in the same network, and for another BSS network, the group IDs of the non-AP STAs in another network are allocated by the AP in the same network, when a non-AP STA belongs to a Group of a BSS network, it owns the GID of the Group. However, when a non-AP STA belongs to two BSS networks (the two BSS networks are respectively BSS1 and BSS2, the access point of BSS1 is AP1, the access point of BSS2 is AP2) at the same time, if a non-AP STA belongs to a Group of BSS1 network, AP1 allocates a GID for the non-AP STA, since BBS2 does not know the situation of GID allocation of BBS1 when allocating GID, there may be a case that the GID allocated by BSS2 and the GID allocated by BSS1 are the same, in this case, for the non-AP STA which belongs to both BSS networks at the same time, a GID conflict exist.

SUMMARY

Embodiments of the present invention provide a method and a device for allocating a group identifier, which can allocate a non-conflict GID to a non-AP STA in an area covered by multiple BSS networks, so that the problem of GID conflict which is occurred when allocating the GID for the non-AP STA can be reduced.

In one aspect, an embodiment of the present invention provides a method for allocating a group identifier, the method includes:

dividing all group identifiers (GIDs) into N parts according to number of the GIDs, and allocating the N parts to N basic service set (BSS) networks, which communicate in a multi user-multiple input multiple output (MU-MIMO) mode, respectively for using, where the N BSS networks have a common area, N is a natural number which is bigger than 1;

where an access point (AP) in a BSS network allocates a group identifier, which is selected from the group identifiers allocated to the BSS network according to a preset order, to a non-AP Station (STA) in the BSS network.

In another aspect, an embodiment of the present invention provides a method for allocating a group identifier, the method includes:

dividing all group identifiers (GID) into N parts according to number of the GIDs, and allocating the N parts to N basic service set (BSS) networks, which communicate in a multi user-multiple input multiple output (MU-MIMO) mode, respectively for using, where the N BSS networks have a common area, N is a natural number which is bigger than 1;

acquiring, by an access point (AP) in a BSS network, area coverage numbers of all terminals (non-AP STAs) in the BSS network, where the area coverage number is a number of BSS(s) which covers a position of the non-AP STA in the BSS network;

allocating, by the AP in the BSS network, a group identifier to a non-AP STA, which is in a common area covered by N BSS networks, in the BSS network according to a preset order firstly from the group identifiers allocated to the BSS network; selecting, an unallocated group identifier from the group identifiers allocated to the BSS network, and allocating a group identifier to a non-AP STA, which is in a common area covered by (N−1) BSS networks, in the BSS network according to the preset order, then allocating a group identifier in turn until allocating a group identifier to a non-AP STA, which is in a common area covered by 2 BSS networks, in the BSS network, and selecting an unallocated group identifier from total number of group identifiers in the MU-MIMO mode, so as to allocate a group identifier to a non-AP STA in an area only covered by the BSS network.

In one aspect, an embodiment of the present invention provides an AP in a BSS network, the AP includes:

a group identifier classifying unit, configured to divide all group identifiers (GID) into N parts according to number of the GIDs, and allocate the N parts to N basic service set (BSS) networks, which communicate in a multi user-multiple input multiple output (MU-MIMO) mode, respectively for using, where the N BSS networks have a common area, N is a natural number which is bigger than 1;

a group identifier allocation unit, configured to allocate a group identifier, which is selected from the group identifiers allocated to the BSS network according to a preset order, to a non-AP Station (STA) in the BSS network.

In another aspect, an embodiment of the present invention provides an AP in a BSS network, the AP includes:

a group identifier classifying unit, configured to divide all group identifiers (GID) into N parts according to number of the GIDs, and allocate the N parts to N basic service set (BSS) networks, which communicate in a multi user-multiple input multiple output (MU-MIMO) mode, respectively for using, wherein the N BSS networks have a common area, N is a natural number which is bigger than 1;

an acquiring unit, configured to acquire area coverage numbers of all terminals (non-AP STAs) in the BSS network, wherein the area coverage number of a non-AP STA is a number of BSS(s) which covers a position of a non-AP STA in the BSS network;

a group identifier allocation unit, configured to allocate a group identifier to a non-AP STA, which is in a common area covered by N BSS networks, in the BSS network according to a preset order firstly from the group identifiers allocated to the BSS network; selecting, an unallocated group identifier from the group identifiers allocated to the BSS network, and allocate a group identifier to a non-AP STA, which is in a common area covered by (N−1) BSS networks, in the BSS network according to the preset order, then allocate a group identifier in turn until allocating a group identifier to a non-AP STA, which is in a common area coverage covered by 2 BSS networks, in the BSS network, and select an unallocated group identifier from total number of group identifiers in the MU-MIMO mode, so as to allocate a group identifier to a non-AP STA in an area only covered by the BSS network.

It can be seen from the above technical schemes that embodiments of the present invention have the following advantages:

Embodiments of the present invention provide methods for allocating a group identifier. According to a method for allocating a group identifier provided by an embodiment, all the group identifiers (GIDs) are divided into N parts according to the number of the group identifiers, and are allocated respectively to N BSS networks which communicate in the multi user-multiple input multiple output (MU-MIMO) mode, then allocate a group identifier, which is selected from the group identifiers allocated to the BSS network, to a non-AP STA in the BSS network according to a preset order, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

According to a method for allocating a group identifier provided by another embodiment, all the group identifiers (GIDs) are divided into N parts according to the number of the group identifiers, and are allocated respectively to N BSS networks which communicate in the multi user-multiple input multiple output (MU-MIMO) mode, then allocate a group identifier, which is selected from the group identifiers allocated to the BSS network, to a non-AP STA in an common area covered by multiple BSS networks according to a preset order, select an unallocated group identifier from all the group identifiers in the MU-MIMO mode, and allocate the group identifier to a non-AP STA in an area only covered by the BSS network. Through the above method for allocating a group identifier, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

BRIEF DESCRIPTION OF THE DRAWINGS

To make technical solutions of the present invention more clearly, the accompanying drawings used for describing embodiments of the present invention are briefly described hereunder. Apparently, the accompanying drawings in the following descriptions merely show some embodiments of the present invention, and persons of ordinary skill in the art can obtain other drawings according to the accompanying drawings without creative efforts.

DETAILED DESCRIPTION

Embodiments of the present invention provide a method and a device for allocating a group identifier, which can allocate non-conflict GIDs to a non-AP STA in an area covered by multiple BSS networks, so that the problem of GID conflict which is occurred when allocating the GID for the non-AP STA can be reduced.

In order to make the purposes, characteristics and advantages of embodiments of the present invention more obvious and understandable, the technical solutions in embodiments of the present invention are described in the following clearly and comprehensively with reference to accompanying drawings in embodiments of the present invention. Obviously, the embodiments described here are only a part of embodiments of the present invention, rather than all embodiments. All other embodiments obtained by those skilled in the art based on embodiments of the present invention should fall within the scope of the present invention.

Figure 1:
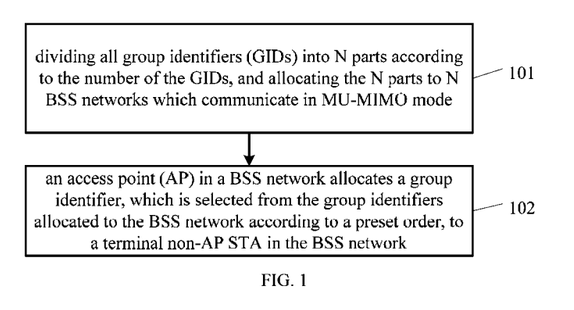
FIG. 1 is a schematic diagram of a method for allocating a group identifier according to an embodiment of the present invention.

A method for allocating a group identifier provided by an embodiment of the present invention, as shown in FIG. 1, including:

101, dividing all group identifiers (GIDs) into N parts according to the number of the GIDs, and allocating the N parts to N BSS networks which communicate in MU-MIMO mode. Where, the N BSS networks have a common area, N is a natural number which is bigger than 1.

The step 101 may specifically be: dividing, according to number of times of communicating in the MU-MIMO mode in a preset time period by each of N BSS networks, all number of group identifiers (GIDs) in the MU-MIMO mode into N parts, and allocating the N parts to the N BSS networks communicating in the MU_MIMO mode respectively for using.

In embodiments of the present invention, in a BSS network, a group identifier of a non-AP STA is allocated by an AP in the BSS network, when the AP performs the MU-MIMO transmission, multiple non-AP STAs performing the MU-MIMO transmission in the same group have a same group identifier.

In the MU-MIMO communication mode, a non-AP STA in N BSS networks may locate in an area covered by a single BSS network, and may also located in the common area covered by 2 or more BSS networks. Since each BSS network does not know the GID allocated by other BSS networks, the non-AP STA in the common area covered by 2 or more BSS networks may have the problem that the GIDs allocated by 2 or more BSS networks conflict with each other.

Figure 2:
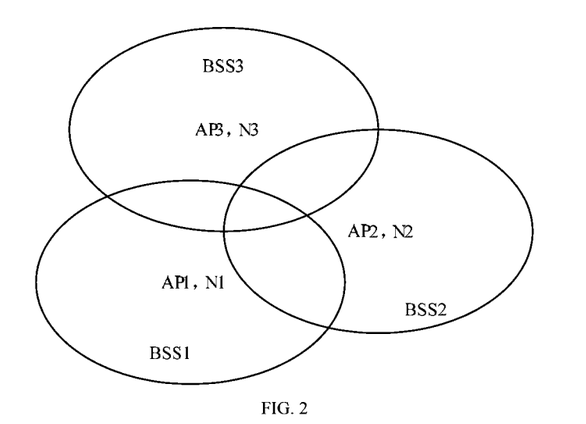
FIG. 2 is a schematic composite structure diagram of 3 BSS networks according to an embodiment of the present invention.

In order to solve the defects of the prior art, in step 101 of the embodiment of the present invention, all GIDs are divided into N parts according to the number of the GIDs, and are allocated respectively to the N BSS networks which communicate in multi user-multiple input multiple output (MU-MIMO) mode. In a practical application, this step may specifically be: dividing, according to the number of times of communicating in the MU-MIMO mode in a preset time period by each of N BSS networks, all number of group identifiers (GIDs) in the MU-MIMO mode into N parts, and allocating the N parts to the N BSS networks respectively for using. For example, as shown in FIG. 2, when N is 3, the 3 BSS networks are respectively BSS1, BSS2 and BSS3, the access point in BSS1 network is AP1, the access point in BSS2 network is AP2, the access point in BSS3 network is AP3, the 3 BSS networks have a common area, for a non-AP STA in the common area, since each of BSS1, BSS2, BSS3 does not know the GID allocated by one another, the GIDs allocated to the non-AP STA in the common area by BSS1, BSS2 and BSS3 may be the same GID, which results in the problem of GID conflict.

In embodiments of the present invention, in a specific implementation, step 101 may include the following steps:

A1, acquiring the number of times of communicating in the MU-MIMO mode in a preset period of time by each of N BSS networks.

For the AP in the BSS network, it can record the number of times of communicating in the MU-MIMO mode by the BSS network in a preset period of time, where the value of the preset period of time may be set by a user, and may also be set by the BSS network itself.

A2, acquiring the probability of communicating in the MU-MIMO mode by each BSS network by dividing the number of times of communicating in the MU-MIMO mode by each BSS network by the number of times of communicating in the MU-MIMO mode by the N BSS networks.

The number of times of communicating in the MU-MIMO mode by the N BSS networks may be acquired by adding the number of times of communicating in the MU-MIMO communication by each BSS network, then the probability of communicating in the MU-MIMO mode by each BSS network may be acquired by dividing the number of times of communicating in the MU-MIMO mode by each BSS network by the number of times of communicating in the MU-MIMO mode by the N BSS networks.

A3, obtaining the number of the group identifiers allocated to each BSS network by multiplying the probability of communicating in the MU-MIMO mode by each BSS network with the total number of group identifiers in MU-MIMO mode.

If the number of the group identifiers allocated to each BSS network, which is acquired by multiplying the probability of communicating in the MU-MIMO mode by each BSS network with the total number of group identifiers in the MU-MIMO mode, is not an integer, round to the nearest integer.

Where, for the MU-MIMO mode, as specified in the IEEE 802.11ac protocol, the total number of group identifiers in the MU-MIMO mode is 61 (from 2 to 62), therefore, the number of group identifiers allocated to each BSS network can be obtained by multiplying the probability of communicating in the MU-MIMO mode by each BSS network with 61.

Take an example for illustration as follows, as shown in FIG. 2, if the number of times of communicating in the MU-MIMO mode by BSS1 network within a preset period of time is 10, the number of times communicating in the MU-MIMO mode by BSS2 network within the preset period of time is 15, the number of times of communicating in the MU-MIMO mode by BSS3 network within the preset period of time is 25, then the number of group identifiers allocated to BSS1 network is $$\frac{10}{10+15+25}*61 \cong 12;$$

the number of group identifiers allocated to BSS2 network is $$\frac{15}{10+15+25}*61 \cong 18;$$

the number of group identifiers allocated to BSS3 network is $$\frac{25}{10+15+25}*61 \cong 31.$$

Therefore, the group identifiers allocated to BSS1 network may be (2~13), the group identifiers allocated to BSS2 network may be (14~31), and the group identifiers allocated to BSS3 network may be (32~62).

It can be seen from the above example, for the 3 BSS networks when N is 3, as shown in FIG. 2, if the number of group identifiers allocated to BSS1 network is N1, the number of group identifiers allocated to BSS2 network is N2, and the number of group identifiers allocated to BSS3 network is N3, then the group identifiers allocated to BSS1 network may be (2~N1+1), the group identifiers allocated to BSS2 network may be (N1+2~N1+N2+1), and the group identifiers allocated to BSS3 network may be (N1+N2+1~N1+N2+N3+1).

102, an access point (AP) in a BSS network allocates a group identifier, which is selected from the group identifiers allocated to the BSS network according to a preset order, to a non-AP STA in the BSS network.

In embodiments of the present invention, after the N BSS networks have been allocated with their group identifiers, an AP in a BSS network allocates a group identifier, which is selected from the group identifiers allocated to the BSS network according to a preset order, to a non-AP STA in the BSS network.

It should be noted that, the preset order in embodiments of the present invention may be an order from the minimum group identifier number to the maximum group identifier number, or, the preset order may also be an order from the maximum group identifier number to the minimum group identifier number. Wherein, the preset order may specifically be set by the user, or may be set by the BSS network itself. Besides, in practical applications, when allocating group identifiers, the specific order should be based on, the AP in the BSS network can recognize the specific order, and the AP follows the same order when allocating group identifiers to other terminals.

For example, for the 3 BSS networks when N is 3, the group identifiers allocated to BSS1 network may be (2~N1+1), the group identifiers allocated to BSS2 network may be (N1+2~N1+N2+1), the group identifiers allocated to BSS3 network may be (N1+N2+1~N1+N2+N3+1). When the group identifiers allocation is performed according to the order from the minimum group identifier number to the maximum group identifier number, the group identifiers allocation performed by each AP begins with the minimum group identifier, for example, AP1 may begin with the allocation of group identifiers 2, 3 and 4; AP2 may begin with the allocation of group identifiers N1+2, N1+3 and N1+4; AP3 may begin with the allocation of group identifiers N1+N2+2, N1+N2+3 and N1+N2+4.

In embodiments of the present invention, after finishing the group identifiers allocation for the non-AP STA in the BSS network in step 102, the method may further include: if the BSS network has released a group identifier, in a next group identifier allocation, the AP in the BSS network allocates a group identifier, which is selected from the group identifiers allocated to the BSS network according to the preset order, to a non-AP STA in the BSS network. For example, for the 3 BSS networks when N is 3, the group identifiers allocated to BSS1 network may be (2~N1+1), the group identifiers allocated to BSS2 network may be (N1+2~N1+N2+1), the group identifiers allocated to BSS3 network may be (N1+N2+1~N1+N2+N3+1). When the group identifiers allocation is performed according to the order from the minimum group identifier number to the maximum group identifier number, if BSS1 network has released a GID 4, in the next group identifier allocation, AP1 allocates a group identifier, which is selected from the identifiers allocated to the BSS network according to the order from the minimum group identifier number to the maximum group identifier number, to a non-AP STA in the BSS network.

In embodiments of the present invention, after finishing the group identifiers allocation for the non-AP STA in the BSS network in step 102, the method may further include: when all of the group identifiers allocated to the BSS network are allocated, the AP in the present BSS network borrows a group identifier from any one or more of the (N−1) BSS networks except the present BSS network and allocates the borrowed group identifier to the non-AP STA in the present BSS network. For example, for the 3 BSS networks when N is 3, the group identifiers allocated to BSS1 network may be (2~N1+1), the group identifiers allocated to BSS2 network may be (N1+2~N1+N2+1), the group identifiers allocated to BSS3 network may be (N1+N2+1~N1+N2+N3+1). When all of the group identifiers (2~N1+1) which have been allocated to BSS1 network are allocated, AP1 borrows a group identifier from AP2 and AP3 and allocates the borrowed group identifier to the non-AP STA in BSS1 network. The method can guarantee the group identifier allocation for the non-AP STA in BSS1 network even all of the group identifiers of BSS1 network have been allocated.

Preferably, when the present BSS network needs to borrow more than one group identifier from the (N−1) BSS networks except the present BSS network, the AP in the present BSS network borrows the group identifiers from the (N−1) BSS networks except the present BSS network in turn. For example, for the 3 BSS networks when N is 3, the group identifiers allocated to BSS1 network may be (2~N1+1), the group identifiers allocated to BSS2 network may be (N1+2~N1+N2+1), the group identifiers allocated to BSS3 network may be (N1+N2+1~N1+N2+N3+1). When the group identifiers allocation is performed according to the order from the minimum group identifier number to the maximum group identifier number, when AP1 borrows group identifiers from BSS2 network and BSS3 network, AP1 uses the larger group identifiers allocated by AP2 and AP3 (such as N1+N2+1 of AP2, N1+N2+N3+1 of AP3), and borrows in turn (for example, after borrowing N1+N2+1 of AP2, if AP1 needs a further GID, AP1 then borrows the GID N1+N2+N3+1 from AP3, if AP still needs a further GID, then borrows the GID N1+N2 from AP2, if AP still needs further GID, then borrows the GID N1+N2+N3 from AP3, . . . ).

According to the method for allocating a group identifier provided by embodiments of the present invention, all the group identifiers (GIDs) are divided into N parts according to the number of the group identifiers, and are allocated respectively to N BSS networks which communicate in the multi user-multiple input multiple output (MU-MIMO) mode, then allocate a group identifier, which is selected from the group identifiers allocated to the BSS network, to a non-AP STA in the BSS network according to a preset order, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

Figure 3:
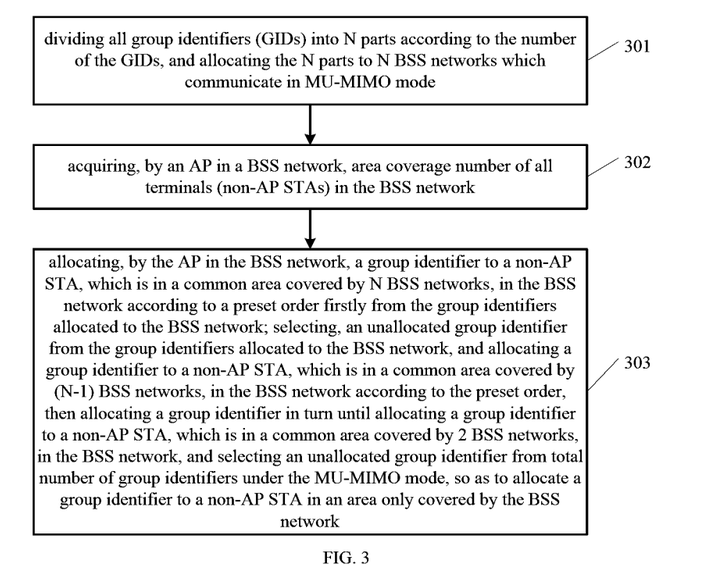
FIG. 3 is a schematic diagram of a method for allocating a group identifier according to another embodiment of the present invention.

Another method for allocating a group identifier provided by embodiments of the present invention is illustrated as follows, as shown in FIG. 3, the method includes:

301, dividing all group identifiers (GIDs) into N parts according to the number of the GIDs, and allocating the N parts to N BSS networks which communicate in MU-MIMO mode.

Where, the N BSS networks have a common area, N is a natural number which is bigger than 1.

The step 301 above may specifically be: dividing, according to number of times of communicating in the MU-MIMO mode in a preset time period by each of N BSS networks, all number of group identifiers (GIDs) in the MU-MIMO mode into N parts, and allocating the N parts to the N BSS networks communicating in the MU_MIMO mode respectively for using. Since the manner of allocating all group identifiers (GIDs) in MU-MIMO mode to the N BSS networks according to the number of the GIDs in step 301 is similar to that in step 101, the details will not be described here.

For the 3 BSS networks when N is 3, if the number of GID allocated for BSS1 network is N1, the number of group identifiers allocated to BSS2 network is N2, the number of group identifiers allocated to BSS3 network is N3, then the group identifiers allocated to BSS1 network may be (2~N1+1), the group identifiers allocated to BSS2 network may be (N1+2~N1+N2+1), the group identifiers allocated to BSS3 network may be (N1+N2+1~N1+N2+N3+1).

In embodiments of the present invention, in a specific implementation, step 301 may include the following steps:

B1, acquiring the number of times of communicating in the MU-MIMO mode in a preset period of time by the N BSS networks.

For the AP in the BSS network, it can record the number of times of communicating in the MU-MIMO mode by the BSS network in a preset period of time, where the value of the preset period of time may be set by a user, and may also be set by the BSS network itself.

B2, acquiring the probability of communicating in the MU-MIMO mode by each BSS network by dividing the number of times of communicating in the MU-MIMO mode by each BSS network by the number of times of communicating in the MU-MIMO mode by the N BSS networks.

The number of times of communicating in the MU-MIMO mode by the N BSS networks may be acquired by adding the number of times of communicating in the MU-MIMO mode by each BSS network, then the probability of communicating in the MU-MIMO mode by each BSS network may be acquired by dividing the number of times of communicating in the MU-MIMO mode by each BSS network by the number of times of communicating in the MU-MIMO mode by the N BSS networks.

B3, obtaining the number of the group identifiers allocated to each BSS network by multiplying the probability of communicating in the MU-MIMO mode by each BSS network with the total number of group identifiers in MU-MIMO mode.

If the number of the group identifiers allocated to each BSS network, which is acquired by multiplying the probability of communicating in the MU-MIMO mode by each BSS network with the total number of group identifiers in the MU-MIMO mode, is not an integer, round to the nearest integer.

Where, for the MU-MIMO mode, as specified in the IEEE 802.11ac protocol, the total number of group identifiers in the MU-MIMO mode is 61 (from 2 to 62), therefore, the number of group identifiers allocated to each BSS network can be obtained by multiplying the probability of communicating in the MU-MIMO mode by each BSS network with 61.

302, acquiring, by an AP in a BSS network, area coverage number of each terminal (non-AP STA) in the BSS network.

The area coverage number of a non-AP STA is the number of BSS(s) which covers a position of a non-AP STA in the BSS network.

Figure 4:
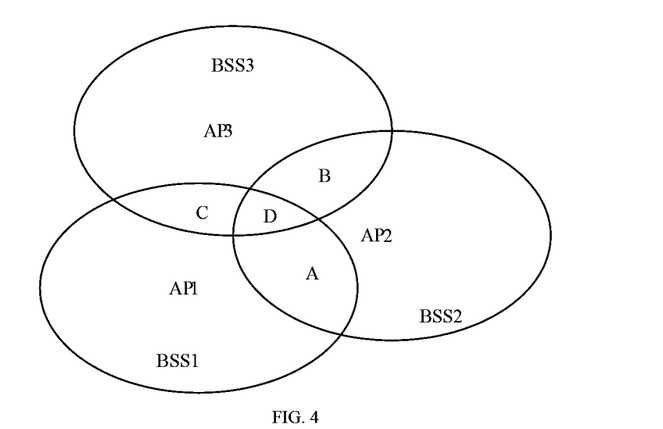
FIG. 4 is a schematic diagram of a common area covered by 3 BSS networks according to an embodiment of the present invention.

In embodiments of the present invention, for step 302, the common area covered by N BSS networks may be acquired, for example, as shown in FIG. 4, when N is 3, the 3 BSS networks are respectively BSS1, BSS2 and BSS3, the access point in BSS1 is AP1, the access point in BSS2 is AP2, the access point in BSS3 is AP3, the 3 BSS networks have common areas, for example, the common area of BSS1 and BSS2 is A, the common area of BSS2 and BSS3 is B, the common area of BSS1 and BSS3 is C, the common area of BSS1, BSS2 and BSS3 is D. In specific implementations, there are multiple implementation manners, which will be described in detail as follows.

In practical applications, a realizable manner is, acquiring, by the AP in each BSS network, the area coverage number of each non-AP STA in the BSS network according to beam forming of each non-AP STA in the BSS network.

For example, for the schematic diagram of a common area covered by 3 BSS networks as shown in FIG. 4, when performing network planning to the 3 BSS networks, the respective coverage area of the 3 BSS networks and which area is the common area are directly determined. The AP in a BSS network may determine the position area of each non-AP STA in the BSS network according to the beam forming of each non-AP STA in the BSS network, and acquires the area coverage number of each non-AP STA in the BSS network according to a combination of the determined position area and the area coverage situation in network planning.

In practical applications, another realizable manner is, acquiring, by the AP in each BSS network, the area coverage number of all non-AP STAs in the BSS network through monitoring energy attenuation of all non-AP STAs in the BSS network on a channel.

For example, for the schematic diagram of common areas covered by 3 BSS networks as shown in FIG. 4, when performing network planning to the 3 BSS networks, the respective coverage area of the 3 BSS networks and which area is the common area are directly determined. The AP in a BSS network may determine the position area of each non-AP STA in the BSS network through monitoring the energy attenuation of each non-AP STAs in the present BSS network on the channel, and acquires the area coverage number of all non-AP STAs in the BSS network according to a combination of the determined position area and the area coverage situation in network planning.

In practical applications, another realizable manner is, acquiring, by the AP in each BSS network, the area coverage number of each non-AP STA in the BSS network according to angle of arrival of a signal which is transmitted by the each non-AP STA in the BSS network and arrives at an antenna.

For example, for the schematic diagram of common coverage areas covered by 3 BSS networks as shown in FIG. 4, when performing network planning to the 3 BSS networks, the respective coverage area of the 3 BSS networks and which area is the common area are directly determined. The AP in a BSS network may determine the position area of the non-AP STA in the BSS network according to the angle of arrival of a signal which is transmitted by each non-AP STA in the BSS network and arrives an antenna, and acquires the area coverage number of all non-AP STAs in the BSS network according to a combination of the determined position area and the area coverage situation in network planning.

In practical applications, another realizable manner is, reporting, by all non-AP STAs in the BSS network initiatively, area coverage numbers of their own respectively to the AP in the BSS network before communicating in the MU-MIMO mode.

For a non-AP STA, before communicating in the MU-MIMO mode, it will send the area coverage number to all APs which can receive the signal of the non-AP STA, then the AP in the BSS network can obtain the area coverage numbers of all non-AP STAs in the BSS network.

In practical applications, another realizable manner is, sending, by the AP in each BSS network, an area coverage querying instruction to all terminals (non-AP STAs) in the BSS network; and feeding, by all non-AP STAs in the BSS network, querying instruction responses back to the AP in the BSS network respectively, where the querying instruction response comprises the area coverage number of the non-AP STA.

303, allocating, by the AP in the BSS network, a group identifier to a non-AP STA, which is in a common area covered by N BSS networks, in the BSS network according to a preset order firstly from the group identifiers allocated to the BSS network; selecting, an unallocated group identifier from the group identifiers allocated to the BSS network, and allocating a group identifier to a non-AP STA, which is in a common area covered by (N−1) BSS networks, in the BSS network according to the preset order, then allocating a group identifier in turn until allocating a group identifier to a non-AP STA, which is in a common area covered by 2 BSS networks, in the BSS network, and selecting an unallocated group identifier from total number of group identifiers in the MU-MIMO mode, so as to allocate a group identifier to a non-AP STA in an area only covered by the BSS network.

It should be noted that, the preset order in this embodiment of the present invention is an order from the minimum group identifier number to the maximum group identifier number, or, the preset order is an order from the maximum group identifier number to the minimum group identifier number. Where, the preset order may specifically be set by the user, or may be set by the BSS network itself. Besides, in practical applications, when allocating group identifiers, the specific order should be based on, the AP in the BSS network can recognize the specific order, and the AP follows the same order when allocating group identifiers to other terminals.

In the embodiment of the present invention, when allocating group identifiers, the AP in the BSS network follows two allocation principles as below:

C1, firstly, allocate a group identifier, which is selected from the identifiers having been allocated to the BSS network according to a preset order, to the non-AP STA having most common coverage areas, and allocating group identifiers in turn according to the number of common coverage area.

C2, when allocating a group identifier to the non-AP STA in the common coverage area, the group identifier is selected from the group identifiers which have been allocated to each BSS network in step 301, however, when allocating a group identifier to the non-AP STA in an area only covered by the BSS network, the group identifier is selected from all group identifiers which are not allocated in the MU-MIMO mode.

Next, an example is taken to describe step 303, as shown in FIG. 4, take the allocating, by AP1 in BSS1 network, group identifiers to non-AP STAs in BSS1 network as an example to describe step 303. AP2 and AP3 may adopt the same allocation manner as AP1, which will not be described here.

For the 3 BSS networks when N is 3, if the number of group identifiers allocated to BSS1 network is N1, the number of group identifiers allocated to BSS2 network is N2, the number of group identifiers allocated to BSS3 network is N3, then the group identifiers allocated to BSS1 network may be (2~N1+1), the group identifiers allocated to BSS2 network may be (N1+2~N1+N2+1), and the group identifiers allocated to BSS3 network may be (N1+N2+1~N1+N2+N3+1).

Firstly, allocate group identifier GID2 to a non-AP STA, which locates in the common area D covered by 3 BSS networks, according to the order of minimum group identifier number.

Then, select an unallocated group identifier from the group identifiers (2~N1+1) which have been allocated to BSS1 network, and allocate the group identifier GID2 to the non-AP STA, which locates in the common area A covered by 2 BSS networks, according to the order from the minimum group identifier number to the maximum group identifier number.

Then, select an unallocated group identifier from the group identifiers (2~N1+1) which have been allocated to BSS1 network, and allocate the group identifier GID3 to the non-AP STA, which locates in the common area C covered by 2 BSS networks, according to the order from the minimum group identifier number to the maximum group identifier number.

Finally, select an unallocated group identifier from all of group identifiers (2~62) in MU-MIMO mode, and allocate group identifier 4 to the non-AP STA in an area only covered by the BSS1 network.

According to the method for allocating a group identifier provided by embodiments of the present invention, all the group identifiers (GIDs) are divided into N parts according to the number of the group identifiers, and are allocated respectively to N BSS networks which communicate in the multi user-multiple input multiple output (MU-MIMO) mode, then allocate a group identifier, which is selected from the group identifiers allocated to the BSS network, to a non-AP STA in an common area covered by multiple BSS networks according to a preset order, select an unallocated group identifier from all the group identifiers in the MU-MIMO mode, and allocate the group identifier to a non-AP STA in an area only covered by the BSS network. Through the above method for allocating a group identifier, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

The above embodiments introduce the method for allocating a group identifier according to embodiments of the present invention, and a device for allocating a group identifier, that is, the AP in the BSS network, will be introduced as follows.

Figure 5:
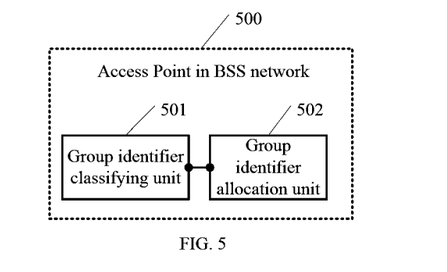
FIG. 5 is a schematic composite structure diagram of an AP in a BSS network according to an embodiment of the present invention.

Please refer to FIG. 5, an access point 500 of a BSS network provided by the embodiment of the present invention, including:

a group identifier classifying unit 501, configured to divide all group identifier (GID)s into N parts according to number of the GIDs, and allocate the N parts to N BSS networks, which communicate in a MU-MIMO mode, respectively for using, where the N BSS networks have a common area, N is a natural number which is bigger than 1.

Alternatively, the group identifier classifying unit 501 may specifically be configured to: divide, according to number of times of communicating in the MU-MIMO mode in a preset time period by each of N BSS networks, all group identifier (GID)s in the MU-MIMO mode into N parts, and allocate the N parts to the N BSS networks communicating in the MU_MIMO mode respectively for using.

a group identifier allocation unit 502, configured to allocate a group identifier, which is selected from the group identifiers allocated to the BSS network according to a preset order, to a non-AP STA in the BSS network.

It should be noted that, for the group identifier classifying unit 501, in practical applications, an alternative implementation manner is, the group identifier classifying unit 501 includes:

an acquiring module, configured to acquire number of times of communicating in the MU-MIMO mode in a preset time period by the N BSS networks;

a probability calculating module, configured to acquire a probability of communicating in the MU-MIMO mode by each BSS network by dividing number of times of communicating in the MU-MIMO mode by each BSS network by the number of times of communicating in the MU-MIMO mode by the N BSS networks;

a group identifier number calculating module, configured to obtain number of the group identifiers allocated to each BSS network by multiplying the probability of communicating in the MU-MIMO mode by each BSS network with total number of group identifiers in the MU-MIMO mode.

It should be noted that, for the group identifier allocation unit 502, in practical applications, an alternative implementation manner is, the group identifier allocation unit 502 is further configured to: if the BSS network has a released group identifier, in a next group identifier allocation, the AP in the BSS network allocates a group identifier, which is selected from the group identifiers allocated to the BSS network according to the preset order, to a non-AP STA in the BSS network.

It should be noted that, for the group identifier allocation unit 502, in practical applications, an alternative implementation manner is, the group identifier allocation unit 502 is further configured to: when all of the group identifiers allocated to the BSS network are allocated, the AP in the BSS network borrows a group identifier from any one or more of the (N−1) BSS networks except the present BSS network and allocates the borrowed group identifier to the non-AP STA in the present BSS network.

It should be noted that, since the content of information interaction and implementation between the above modules/ units is based on a same concept with the method embodiments of the present invention, the technical effect is the same as the method embodiment of the present invention, for the details please refer to the description in the method embodiment as shown in FIG. 1, which will not be described here.

According to the access point 500 in the BSS network provided by the embodiment of the present invention, the group identifier classifying unit 501 divides all the group identifiers into N parts according to the number of the group identifiers, allocates respectively to N BSS networks which communicate in the MU-MIMO mode, then the group identifier allocation unit 502 allocates a group identifier, which is selected from the group identifiers allocated to the BSS network, to a non-AP STA in the BSS network according to a preset order, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

Figure 6:
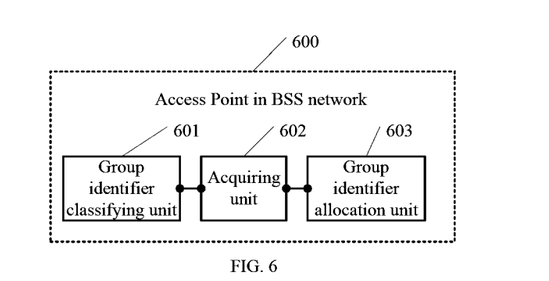
FIG. 6 is a schematic composite structure diagram of an AP in a BSS network according to an embodiment of the present invention.

Another access point in the BSS network is provided by the embodiment of the present invention will be introduced as follows, as shown in FIG. 5, the access point 600 in the BSS network provided by the embodiment of the present invention includes:

a group identifier classifying unit 601, configured to divide all group identifiers (GIDs) into N parts according to number of the GIDs, and allocate the N parts to N BSS) networks, which communicate in a MU-MIMO mode, respectively for using, where the N BSS networks have a common area, N is a natural number which is bigger than 1.

Alternatively, the group identifier classifying unit 601 may specifically be configured to: divide, according to number of times of communicating in the MU-MIMO mode in a preset time period by each of N BSS networks, all group identifier (GID)s in the MU-MIMO mode into N parts, and allocate the N parts to the N BSS networks communicating in the MU_MIMO mode respectively for using.

an acquiring unit 602, configured to acquire area coverage numbers of all terminals (non-AP STAs) in the BSS network, where the area coverage number of a non-AP STA is a number of the BSS(s) which covers a position of a non-AP STA in the BSS network.

a group identifier allocation unit 603, configured to allocate a group identifier to a non-AP STA, which is in a common area covered by N BSS networks, in the BSS network according to a preset order firstly from the group identifiers allocated to the BSS network; selecting, an unallocated group identifier from the group identifiers allocated to the BSS network, and allocate a group identifier to a non-AP STA, which is in a common area covered by (N−1) BSS networks, in the BSS network according to the preset order, then allocate a group identifier in turn until allocating a group identifier to a non-AP STA, which is in a common area covered by 2 BSS networks, in the BSS network, and select an unallocated group identifier from total number of group identifiers in the MU-MIMO mode, so as to allocate a group identifier to a non-AP STA in an area only covered by the BSS network.

It should be noted that, for the group identifier classifying unit 601, in practical applications, an alternative implementation manner is, the group identifier classifying unit 601 includes:

an acquiring module, configured to acquire number of times of communicating in the MU-MIMO mode in a preset time period by the N BSS networks;

a probability calculating module, configured to divide number of times of communicating in the MU-MIMO mode by each BSS network by the number of times of communicating in the MU-MIMO mode by the N BSS networks, acquire a probability of communicating in the MU-MIMO mode by each BSS network;

a group identifier number calculating module, configured to obtain number of the group identifiers allocated to each BSS network by multiplying the probability of communicating in the MU-MIMO mode by each BSS network with total number of group identifiers in the MU-MIMO mode.

It should be noted that, for the acquiring unit 602, in practical applications, an implementation manner is, the acquiring unit 602 is specifically configured to acquire the area coverage numbers of all non-AP STAs in the BSS network according to beam forming of all non-AP STAs in the BSS network.

It should be noted that, for the acquiring unit 602, in practical applications, an implementation manner is, the acquiring unit 602 is specifically configured to acquire the area coverage numbers of all non-AP STAs in the BSS network through monitoring energy attenuation of all non-AP STAs in the BSS network on a channel.

It should be noted that, for the acquiring unit 602, in practical applications, an implementation manner is, the acquiring unit 602 is specifically configured to acquire the area coverage numbers of all non-AP STAs in the BSS network according to angle of arrival of a signal which is transmitted by each non-AP STA in the BSS network and arrives an antenna.

It should be noted that, for the acquiring unit 602, in practical applications, an implementation manner is, the acquiring unit 602 is specifically configured to receive area coverage numbers of all non-AP STAs in the BSS network which are reported by all non-AP STAs in the BSS network initiatively before communicating in the MU-MIMO mode.

It should be noted that, for the acquiring unit 602, in practical application, an implementation manner is, the acquiring unit 602 is specifically configured to send an area coverage querying instruction to all non-AP STAs in the BSS network; and receive a querying instruction response fed by all non-AP STAs in the present BSS network respectively to the AP in the BSS network, where the querying instruction response comprises the area coverage number of the non-AP STA.

It should be noted that, since the content of information interaction and implementation between the above modules/units is based on a same concept with the method embodiment of the present invention, the technical effect is the same as the method embodiment of the present invention, for the details please refer to the description in the method embodiment as shown in FIG. 3, which will not be described here.

According to the access point 600 in the BSS network provided by the embodiment of the present invention, where, the group identifier classifying unit 601 divides all the group identifiers into N parts according to the number of the group identifiers, and allocate respectively to N BSS networks which communicate in the MU-MIMO, then the group identifier allocation unit 603 allocates allocate a group identifier, which is selected from the group identifiers allocated to the BSS network, to a non-AP STA in an common area covered by multiple BSS networks according to a preset order, then the group identifier allocation unit 603 selects an unallocated group identifier from all the group identifiers in the MU-MIMO mode, and allocate the group identifier to a non-AP STA in an area only covered by the BSS network. Through the above access point for allocating a group identifier above, since when the AP in the BSS network allocates a group identifier to the non-AP STA, the AP selects the allocated group identifier from the group identifiers allocated to the BSS network, thus the method can allocate non-conflict GIDs to a non-AP STA in an area covered by multiple BSS networks, so that the problem of GID conflict which is occurred when allocating the GID for the non-AP STA can be reduced.

Those of ordinary skill in the art should understand that all or part of the steps in the method according to embodiments of the present invention may be implemented by a program instructing relevant hardware, and the program may be stored in a computer readable storage media, where the readable storage media can be a ROM, a magnetic disk, or an optical disk.

The method and device for allocating a group identifier provided by the present invention are introduced above in detail, it is apparent to those of ordinary skill in the art that modifications and variations can be made to the specific implementation and application scope according to the ideas of the present invention. To sum up, the content of the specification is not intended to limit the invention.

What is claimed is:

1. A method for allocating a group identifier, comprising:
   dividing all group identifies (GIDs) into N parts according to a quantity of the GIDs; and
   respectively allocating the N parts of the GIDs to N basic service set (BSS) networks, which communicate in a multi user-multiple input multiple output (MU-MIMO) mode, wherein the N BSS networks have a common area, N is a natural number which is greater than 1;
   wherein, the dividing all the GIDs into the N parts according to the quantity of the GIDs, and respectively allocating the N parts of the GIDs to the N BSS networks, which use the MU-MIMO communication mode, comprises:
   acquiring a number of times of communicating in the MU-MIMO mode in a preset time period by the N BSS networks;
   acquiring a probability of communicating in the MU-MIMO mode by each BSS network by dividing a number of times of communicating in the MU-MIMO mode by each BSS network by the number of times of communicating in the MU-MIMO mode by the N BSS networks;
   obtaining a quantity of GIDs allocated to each BSS network by multiplying the probability of communicating in the MU-MIMO mode by each BSS network with a total number of GIDs in the MU-MIMO mode;
   dividing all the GIDs into the N parts according to the quantity of the GIDs allocated to each BSS network; and
   respectively allocating the N parts to the N BSS networks.

2. The method for allocating the group identifier according to claim 1, wherein, the dividing all the GIDs into the N parts according to the quantity of the GIDs, and respectively allocating the N parts to the N BSS networks, which communicate in the MU-MIMO mode, comprises:
   dividing, according to a number of times of communicating in the MU-MIMO mode in a preset time period by each of the N BSS networks, all the GIDs into the N parts; and
   respectively allocating the N parts of the GIDs to the N BSS networks communicating in the MU-MIMO mode.

3. A method for allocating a group identifier (GID), wherein all GIDs are divided into N parts according to a quantity of the GIDs, and the N parts of the GIDs are respectively allocated to N basic service set (BSS) networks, which communicate in a multi user-multiple input multiple output (MU-MIMO) mode, and the N BSS networks have a common area, N is a natural number which is greater than 1, comprising:
   allocating, by an access point (AP) in a BSS network, a GID to a non-AP Station (STA), which is in the common area covered by the N BSS networks, in the BSS network according to a preset order firstly from GIDs allocated to the BSS network;
   selecting, an unallocated GID from the GID allocated to the BSS network, and allocating the unallocated GID to a non-AP STA, which is in a common area covered by (N−1) BSS networks, in the BSS network according to the preset order, then allocating a GID in turn until allocating a GID to a non-AP STA, which is in a common area covered two BSS networks, in the BSS network; and
   selecting another unallocated GID from the GIDs allocated to the N BSS networks, so as to allocate the another unallocated GID to a non-AP STA only covered by the BSS network.

4. The method for allocating the group identifier according to claim 3, wherein, the preset order is an order from one of (a) a minimum group identifier number to a maximum group identifier number
   and (b) the maximum group identifier number to the minimum group identifier number.

5. The method for allocating the group identifier according to claim 3, further comprising:
   acquiring, by the AP, area coverage numbers of all non-AP STAs in the BSS network, wherein the area coverage number of one of the non-AP STAs is a number of BSS(s) which covers a position of the one of the non-AP STAs in the BSS network.

6. The method for allocating the group identifier according to claim 5, wherein, the acquiring, by the AP, the area coverage numbers of all the non-AP STAs in the BSS network, comprises one of the following:
   acquiring, by the AP, the area coverage numbers of all the non-AP STAs in the BSS network according to beam forming of all the non-AP STAs in the BSS network;
   acquiring, by the AP, the area coverage numbers of all the non-AP STAs in the BSS network through monitoring energy attenuation of all the non-AP STAs in the BSS network on a channel; and
   acquiring, by the AP, the area coverage numbers of all the non-AP STAs in the BSS network according to an angle of arrival of a signal which is transmitted by each non-AP STA in the BSS network and arrives at an antenna.

7. The method for allocating the group identifier according to claim 5, wherein, the acquiring, by the AP, the area coverage numbers of all the non-AP STAs in the BSS network, comprises:
   receiving, by the AP, the area coverage numbers reported respectively by all of the non-AP STAs before communicating in the MU-MIMO mode.

8. The method for allocating the group identifier according to claim 5, wherein, the acquiring, by the AP, the area coverage numbers of all the non-AP STAs in the BSS network, comprises:
   sending, by the AP, an area coverage querying instruction to all the non-AP STAs in the BSS network;
   receiving, by the AP, querying instruction responses fed back respectively by all the non-AP STAs in the BSS network, wherein the querying instruction response comprises the area coverage number of the one of the non-AP STAs.

9. A computer program product comprising a readable storage medium storing program code thereon for use by a basic service set (BSS) network, the program code-comprising:
   instructions for dividing all group identifiers (GIDs) into N parts according to a quantity of the GIDs, and
   instructions for respectively allocate the N parts of the GIDs to N BSS networks, which communicate in a multi user-multiple input multiple output (MU-MIMO) mode, wherein the N BSS networks have a common area, N is a natural number which is greater than 1;

wherein, the instructions for dividing all the GIDs into the N parts according to the quantity of the GIDs comprises:
instructions for acquiring a number of times of communicating in the MU-MIMO mode in a preset time period by the N BSS networks;
instructions for acquiring a probability of communicating in the MU-MIMO mode by each BSS network by dividing a number of times of communicating in the MU-MIMO mode by each BSS network by the number of times of communicating in the MU-MIMO mode by the N BSS networks;
instructions for obtaining a quantity of the GIDs allocated to each BSS network by multiplying the probability of communicating in the MU-MIMO mode by each BSS network with a total number of GIDs in the MU-MIMO mode;
instructions for dividing all the GIDs into the N parts according to the quantity of the GIDs allocated to each BSS network; and
instructions for respectively allocating the N parts to the N BSS networks.

10. The computer program product according to claim 9, wherein, the instructions for dividing all the GIDs into the N parts according to the quantity of the GIDs comprises:
instructions for dividing, according to a number of times of communicating in the MU-MIMO mode in a preset time period by each of the N BSS networks, the GIDs into the N parts, and
instructions for allocating the N parts of the GIDs to the N BSS networks communicating in the MU-MIMO mode respectively.

11. A computer program product comprising a readable storage medium storing program code thereon for use an access point (AP) in a basic service set (BSS) network, wherein all group identifiers (GIDS) are divided into N parts according to a quantity of the GIDs, and the N parts of the GIDs are respectively allocated to N basic service set (BSS) networks, which communicate in a multi user-multiple input multiple output (MU-MIMO) mode, and the N BSS networks have a common area, N is a natural number which is greater than 1, the program code comprising:
instructions for allocating a GID to a non-AP Station (STA), which is in the common area covered by the N BSS networks, in the BSS network according to a preset order firstly from the GIDs allocated to the BSS network;
instructions for selecting an unallocated GID from the GIDs allocated to the BSS network, and allocate the unallocated GID to a non-AP STA, which is in a common area covered by (N−1) BSS networks, in the BSS network according to the preset order, then allocate a GID in turn until allocating a GID to a non-AP STA, which is in a common area covered by 2 BSS networks, in the BSS network, and selecting another unallocated GID from the GIDs allocated to the N BSS networks, so as to allocate the another unallocated GIDs to a non-AP STA in an area only covered by the BSS network.

12. The computer program product according to claim 11, wherein the program code further comprises:
instructions for acquiring area coverage numbers of all non-AP STAs in the BSS network, wherein the area coverage number of one of the non-AP STAs is a number of BSS(s) which covers a position of the one of the non-AP STAs in the BSS network.

13. The computer program product according to claim 12, wherein, the instructions for acquiring the area coverage numbers of all the non-AP STAs in the BSS network comprises one of the following:
instructions for acquiring the area coverage numbers of all the non-AP STAs in the BSS network according to beam forming of all the non-AP STAs in the BSS network;
instructions for acquiring the area coverage numbers of all the non-AP STAs in the BSS network through monitoring energy attenuation of all the non-AP STAs in the BSS network on a channel; and
instructions for acquiring the area coverage numbers of all the non-AP STAs in the BSS network according to an angle of arrival of a signal which is transmitted by each non-AP STA in the BSS network and arrives at an antenna.

14. The computer program product according to claim 12, wherein, the instructions for acquiring the area coverage numbers of all the non-AP STAs in the BSS network further comprises receiving the area coverage numbers of all the non-AP STAs in the BSS network which are reported by all the non-AP STAs in the BSS network initiatively before communicating in the MU-MIMO mode.

15. The computer program product according to claim 12, wherein, the instructions for acquiring the area coverage numbers of all the non-AP STAs in the BSS network comprises:
instructions for sending an area coverage querying instruction to all the non-AP STAs in the BSS network; and
instructions for receiving a querying instruction response fed back by all the non-AP STAs in the present BSS network respectively to the AP in the BSS network, wherein the querying instruction response comprises the area coverage number of the one of the non-AP STAs.

* * * * *

UNITED STATES PATENT AND TRADEMARK OFFICE
CERTIFICATE OF CORRECTION

PATENT NO.       : 9,179,484 B2           Page 1 of 1
APPLICATION NO.  : 14/206888
DATED            : November 3, 2015
INVENTOR(S)      : Chen et al.

It is certified that error appears in the above-identified patent and that said Letters Patent is hereby corrected as shown below:

Claims

Column 17, Claim 11, line 33, "use an" should read -- use by an --.

Signed and Sealed this
Seventh Day of June, 2016

Michelle K. Lee
*Director of the United States Patent and Trademark Office*